Feb. 23, 1954   J. M. BIDDISON   2,670,145
ARMATURE WINDING MACHINE
Filed Nov. 23, 1951   10 Sheets-Sheet 1
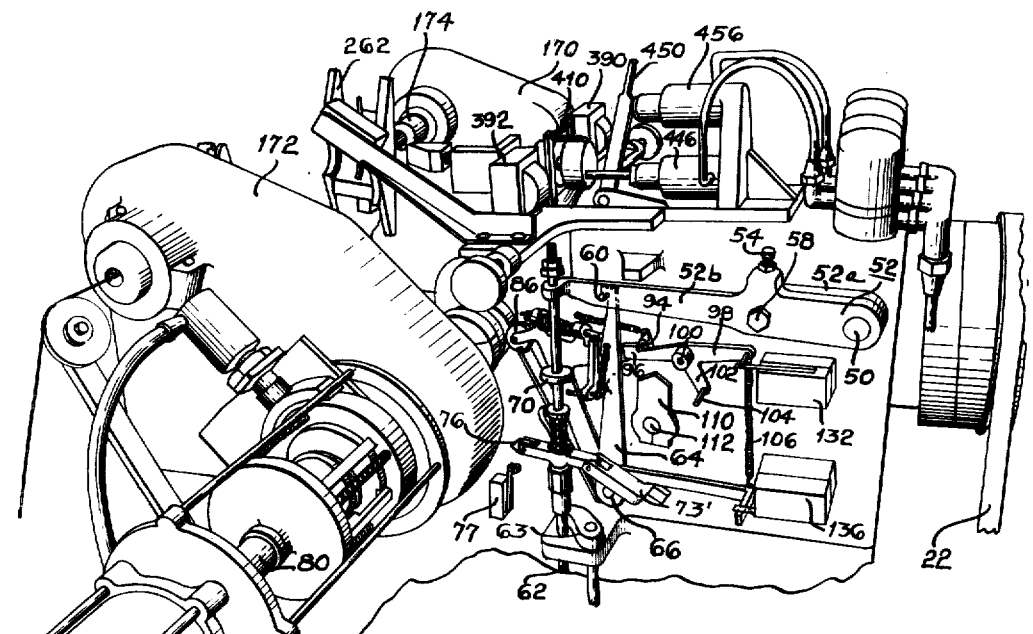
FIG. 1
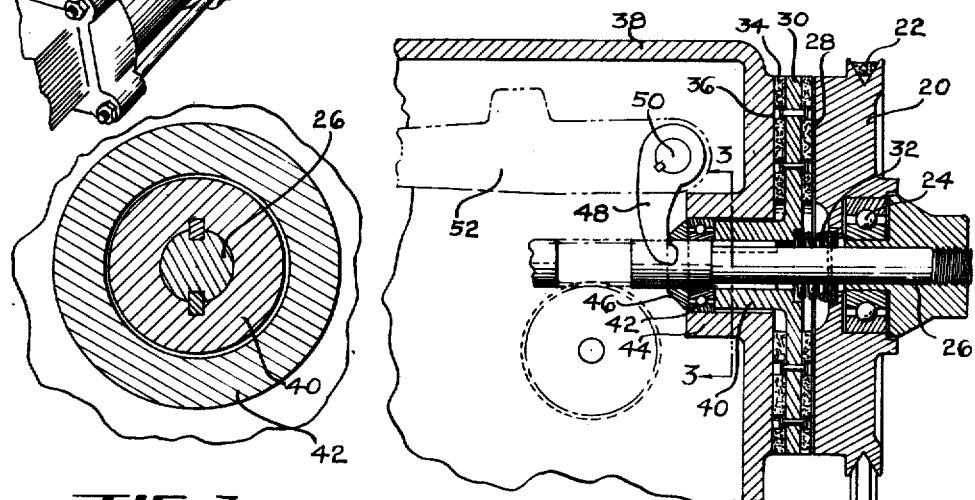
FIG. 3
FIG. 2
INVENTOR.
John M. Biddison
BY
Dybvig & Dybvig
HIS ATTORNEYS

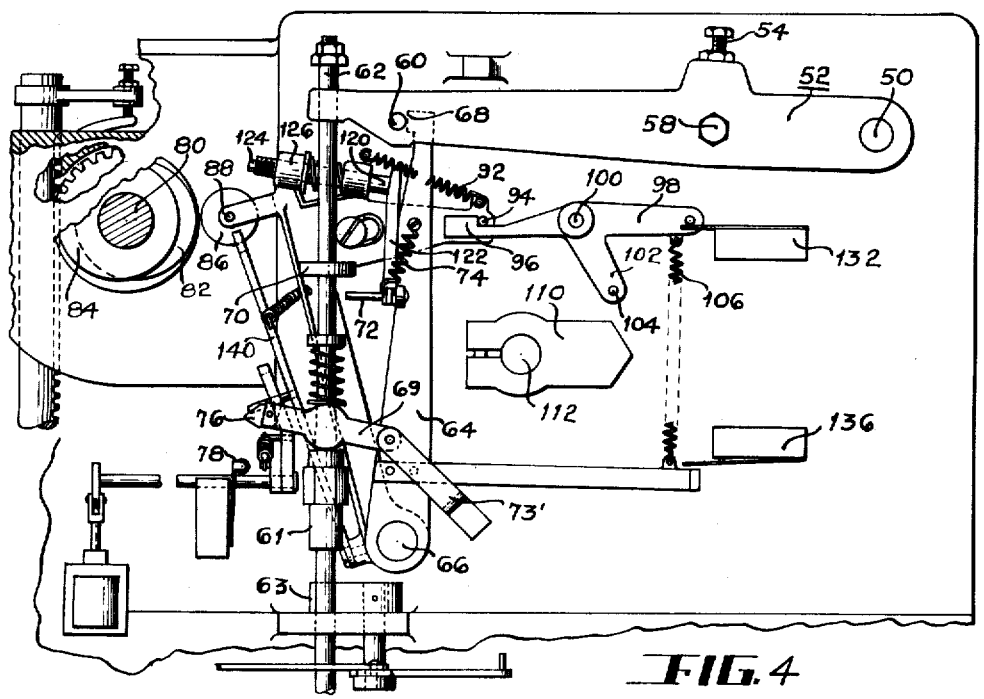

Feb. 23, 1954

J. M. BIDDISON 2,670,145

ARMATURE WINDING MACHINE

Filed Nov. 23, 1951

INVENTOR.
John M. Biddison
BY
Dybvig & Dybvig
HIS ATTORNEYS

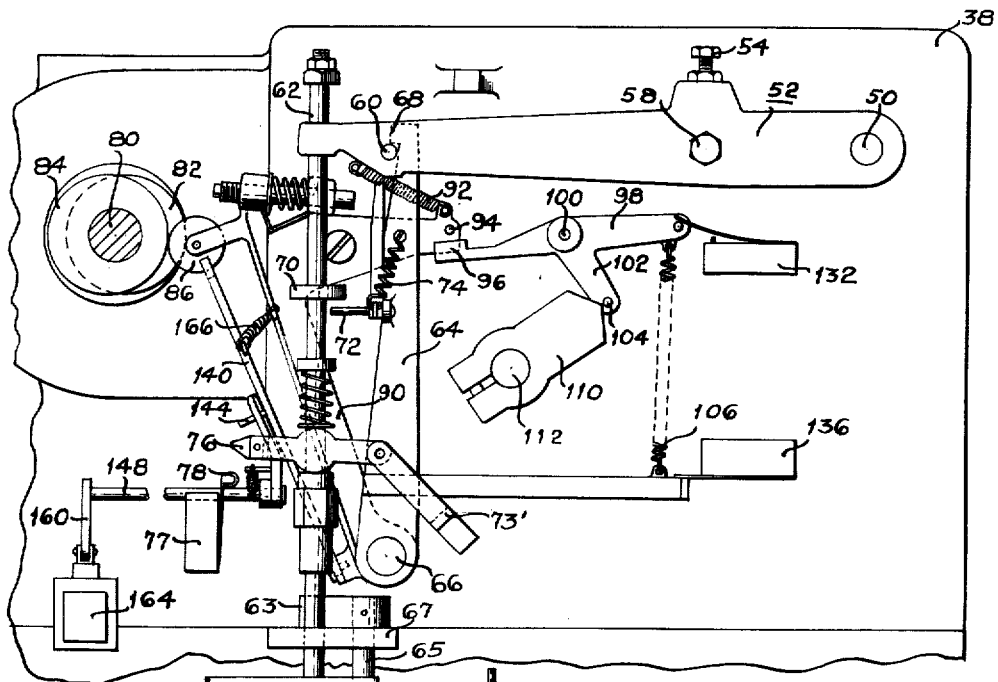
FIG. 8
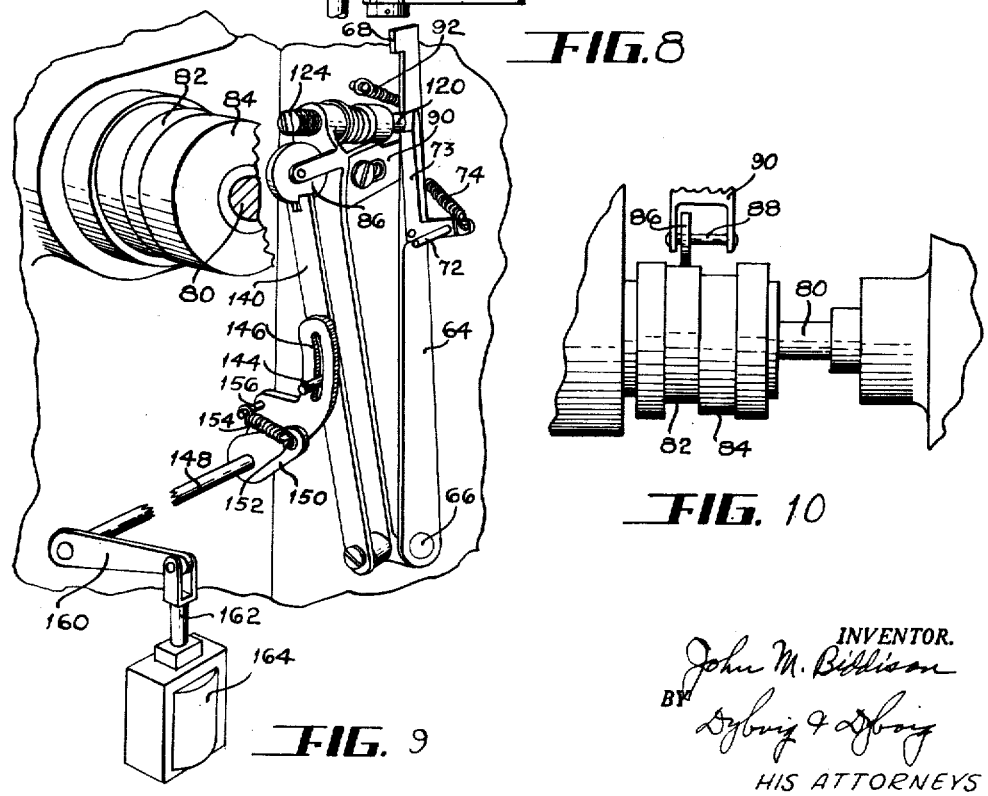
FIG. 9
FIG. 10
INVENTOR.
John M. Biddison
BY
Dybvig & Dybvig
HIS ATTORNEYS INVENTOR.
John M. Biddison
BY
Dybvig & Dybvig
HIS ATTORNEYS

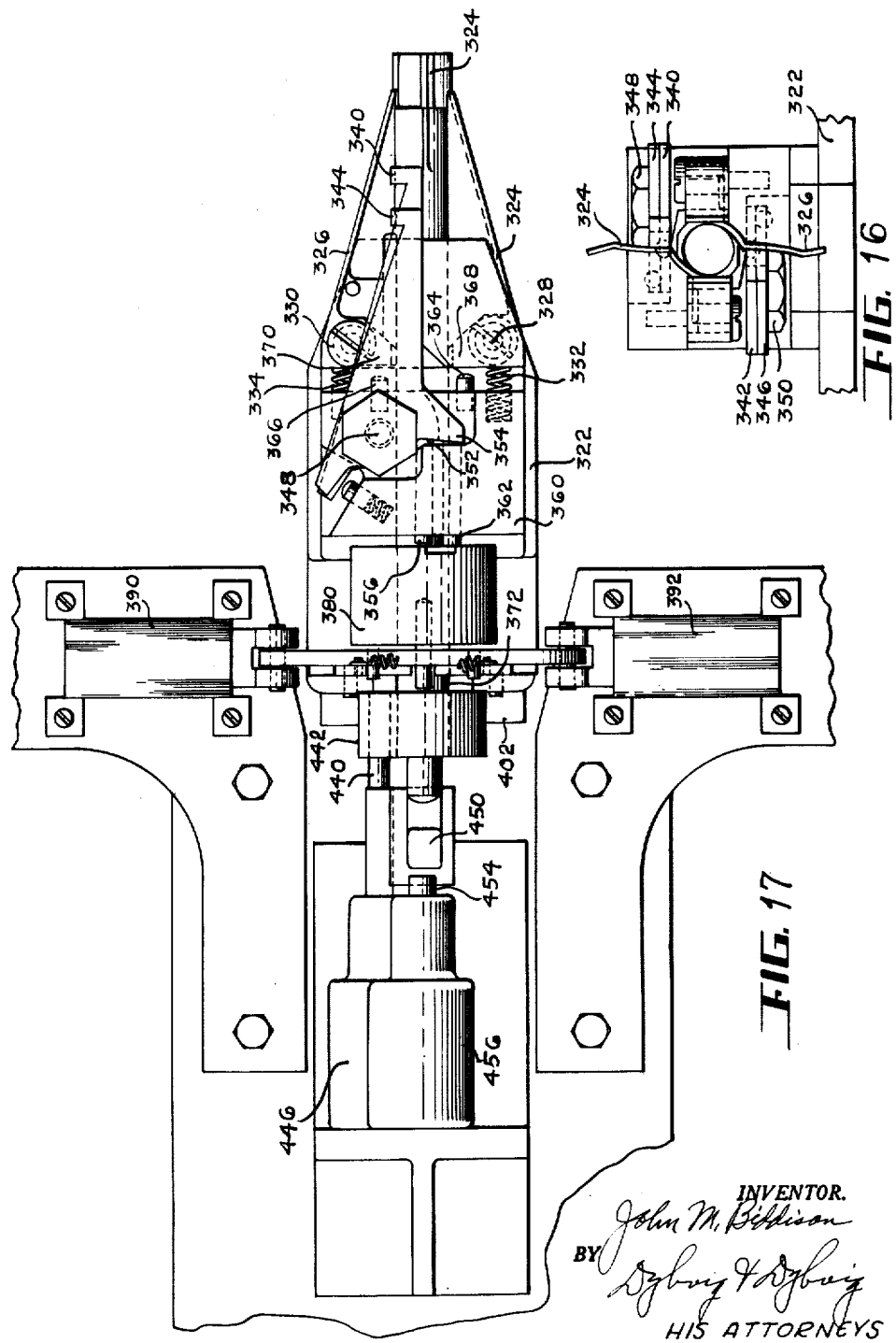

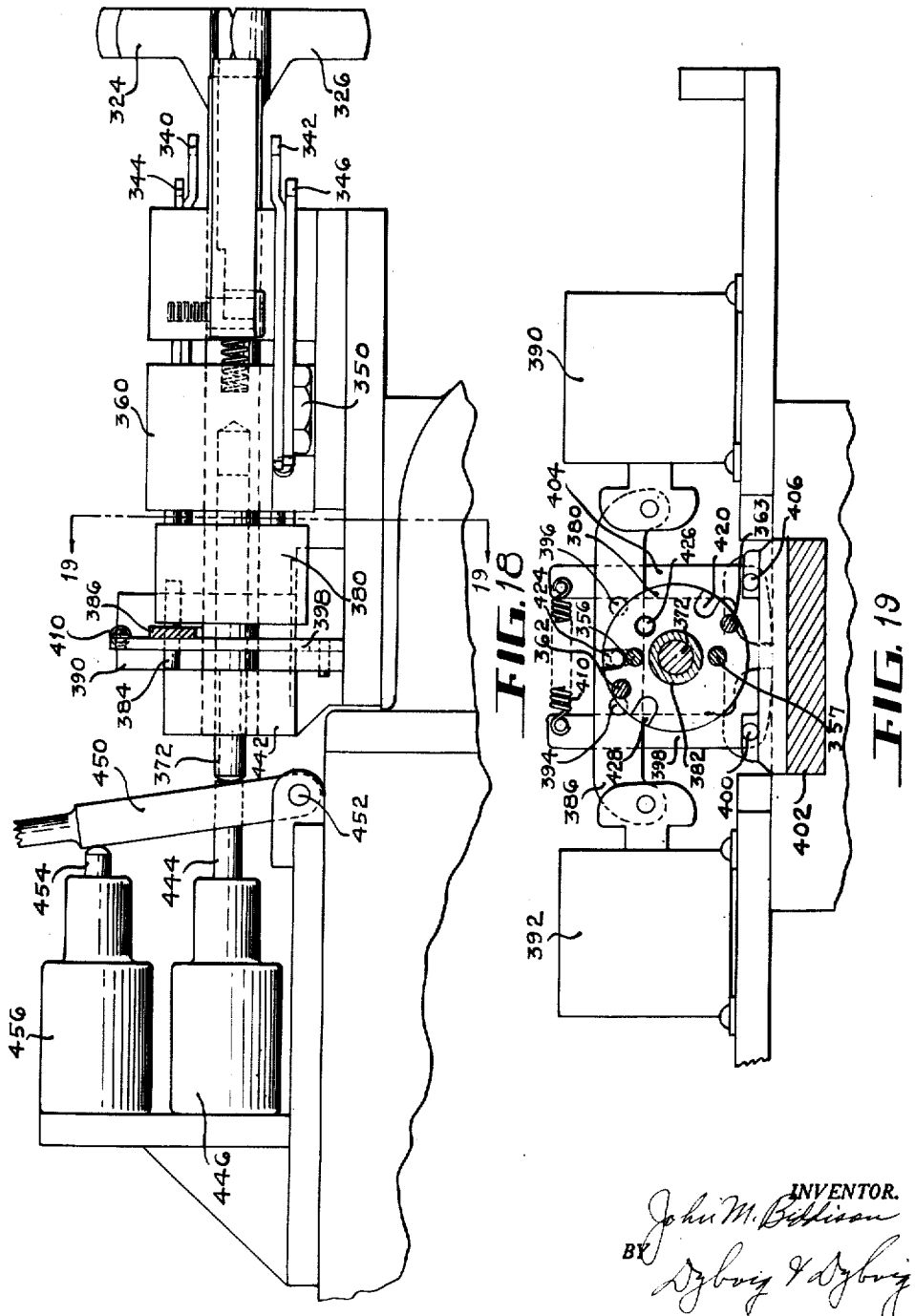

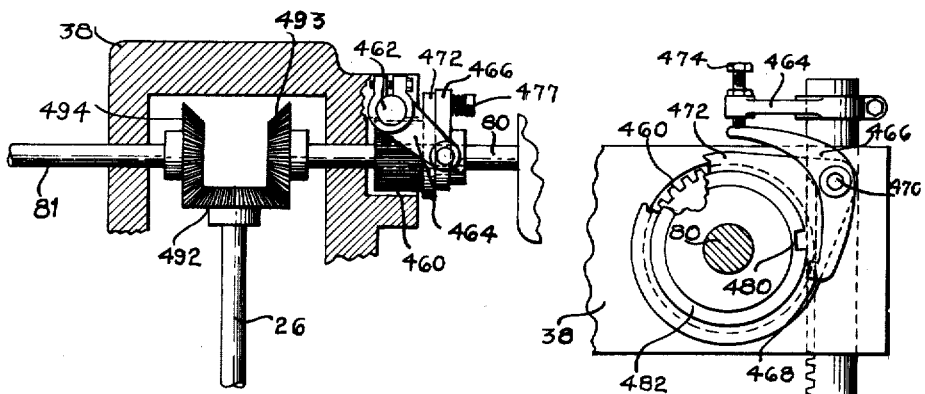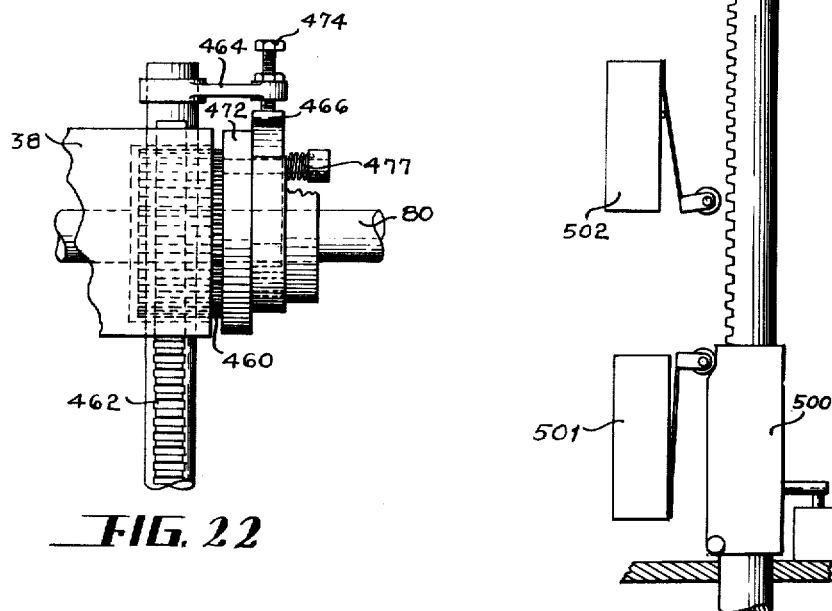

Patented Feb. 23, 1954

2,670,145

UNITED STATES PATENT OFFICE 2,670,145

ARMATURE WINDING MACHINE

John M. Biddison, Dayton, Ohio, assignor to Harry W. Moore, Dayton, Ohio

Application November 23, 1951, Serial No. 257,711

20 Claims. (Cl. 242—13)

This invention relates to a coil winding machine and the method of winding armatures and more particularly to a coil winding machine adapted to wind and lay coils in slots formed between radially disposed teeth, such as a rotor or an armature.

In the manufacture of rotors or armatures and certain types of stators, wherein the coils are laid in slots formed between radially disposed teeth or projections, leads project from the coils for attachment into a circuit either through the commutator bars, slip rings or terminals, depending upon the type of machine in which the windings are to be used. In some of these machines an even number of coils are used, permitting the use of two fliers or spinner heads, so as to wind a pair of coils simultaneously. In other machines, however, an odd number of coils are used. In this type of structure, double fliers have not been used, for the reason that two coils are wound simultaneously, thereby the machine is unable to accommodate an odd number of coils.

An object of this invention is to provide a coil winding machine having two fliers, wherein one of the fliers may be used independently of the other, so as to permit the winding of the odd numbered coil. This has been accomplished by interconnecting the two fliers by a clutch mechanism such that the clutch mechanism when adjusted into one position will cause one of the fliers to rotate and when in another position will cause both of the fliers to rotate.

Another object of this invention is to provide mechanism for forming leads extending from the coils, these leads being of unequal length, so that one lead is longer than the other lead from the coil. This has been accomplished by projecting lead-forming members or hooks into the path of the wire being wound at the proper time, the mechanism projecting into the path consisting of hooks unequally spaced, so that when one hook engages the wire being wound, one loop or lead is formed and when another hook engages the wire, another loop or lead is formed. This has been accomplished by reversing the fliers through a fraction of a revolution, 180° more or less, and for some types of windings rotating the rotor or form receiving the winding through the width of one tooth in one direction, so as to cause the return lead to be placed in an adjacent slot, then after the fliers have been returned to their home position, returning the rotor to the original position before continuing the winding of another coil or pair of coils, as the case may be. This results in a tooth on the rotor functioning as an anchor for the projecting loop.

Another object of this invention is to provide a control mechanism for accurately arresting the movement of the fliers when the fliers are actuated into a predetermined position, so as to accurately control the operation of the coil winding machine. This has been accomplished by the use of a cam mechanism rotating in unison with one of the fliers and a cam follower that is moved into operative position with the cam for controlling the stopping of the fliers, the cam follower causing the clutch used in driving the coil winding machine to be disengaged when the fliers are in a predetermined position and causing a brake to be applied to the fliers so as to arrest the movement of the fliers at the proper time and in the proper position.

Another object of this invention relates to the method of winding a plurality of coils wherein a lead is placed in an adjacent slot to the coil after a coil has been completed and before a succeeding coil is wound, so that the tooth between the adjacent slots functions as an anchor for positively holding the lead in position.

Another object of this invention is to provide an armature wherein a lead for a coil is anchored upon the tooth of the rotor or the stator, as the case may be.

Other objects and advantages reside in the construction of parts, the combination thereof and the mode of operation, as will become more apparent from the following description.

Referring to the drawings, Figure 1 is a perspective elevational view of the driving and operating mechanism of a coil winding machine.

Figure 2 is a fragmentary cross sectional view of the clutch and brake mechanism.

Figure 3 is a fragmentary cross sectional view taken substantially on the line 3—3 of Figure 2.

Figure 4 is a fragmentary side elevational view of a clutch and brake control mechanism, disclosing the position of the clutch control mechanism when the coil winding machine is stoppped.

Figure 5 is a view similar to Figure 4, showing the position of the control mechanism when the brake is released.

Figure 6 discloses the clutch control mechanism in the position when it is ready to start.

Figure 7 discloses the clutch control mechanism when the clutch is connected so as to drive the coil winding machine.

Figure 8 discloses the control mechanism in the position near the completion of the winding of a coil.

Figure 9 is a perspective view of a portion of the cam and the cam follower used in causing the coil winding machine to stop with the flier in a predetermined position.

Figure 10 is a fragmentary detail view of the cam and the cam follower.

Figure 11:
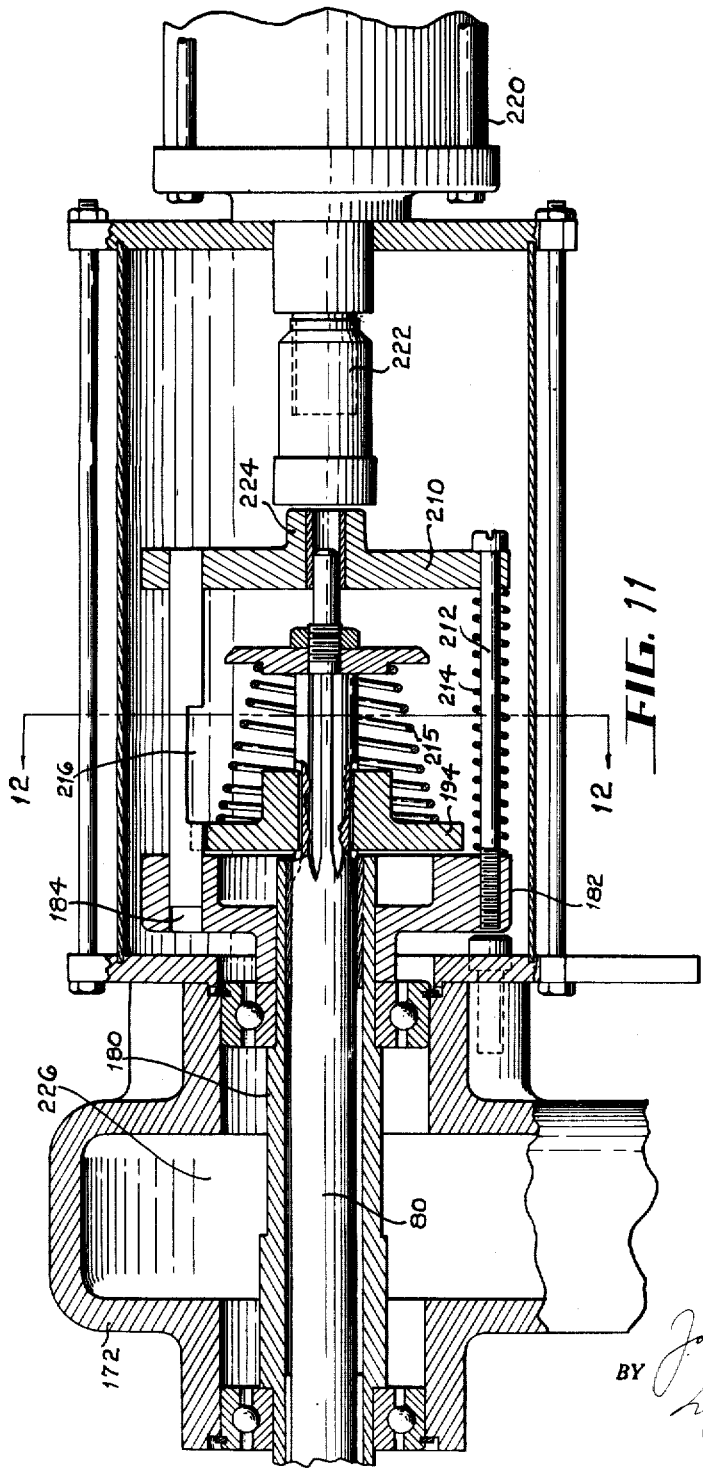

Figure 11 is a fragmentary cross sectional view of the clutch mechanism used in actuating one of the fliers.

Figure 12:
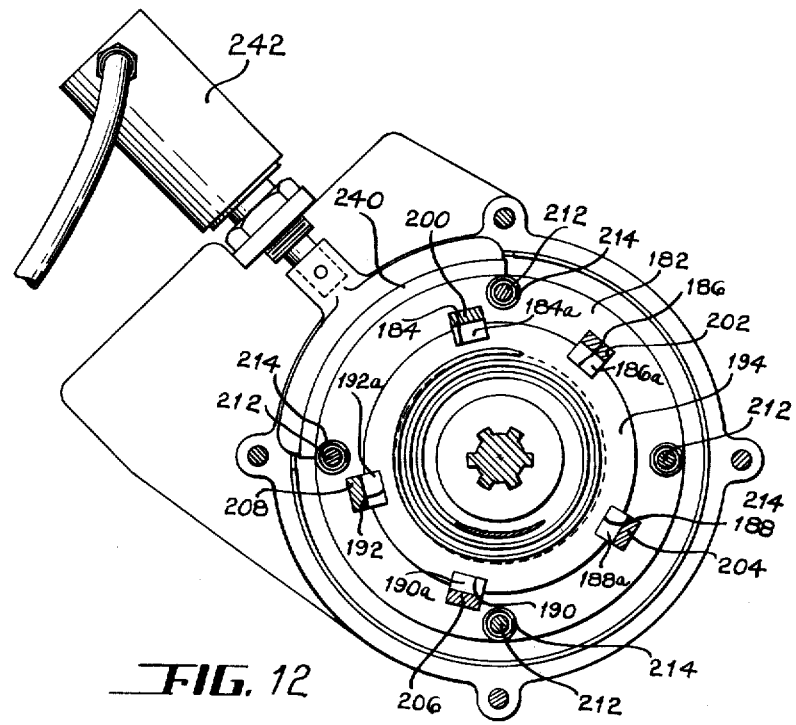

Figure 12 is another cross sectional view of the clutch mechanism taken substantially on the line 12—12 of Figure 11.

Figure 13:
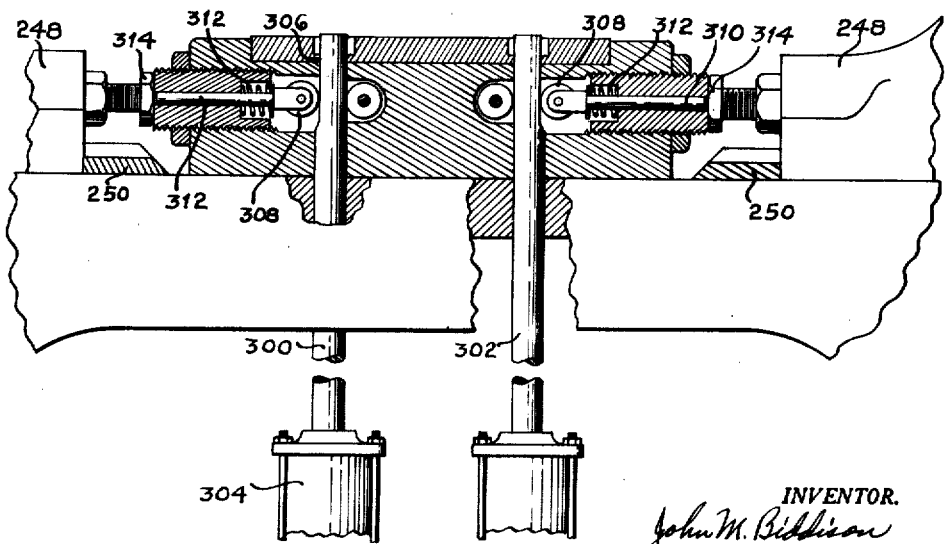

Figure 13 is a fragmentary cross sectional view disclosing the mechanism for causing the armature to be shifted from one position to another.

Figure 14:
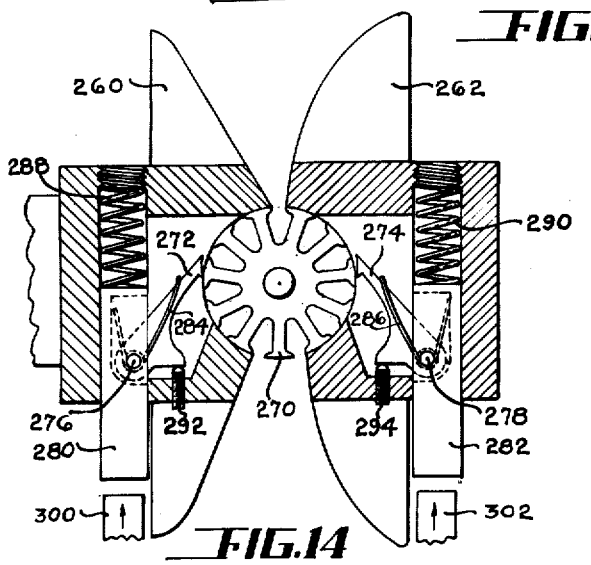

Figure 14 is a cross sectional view of the chuck members supporting an armature and the driving mechanism for causing registry of the armature.

Figure 15:
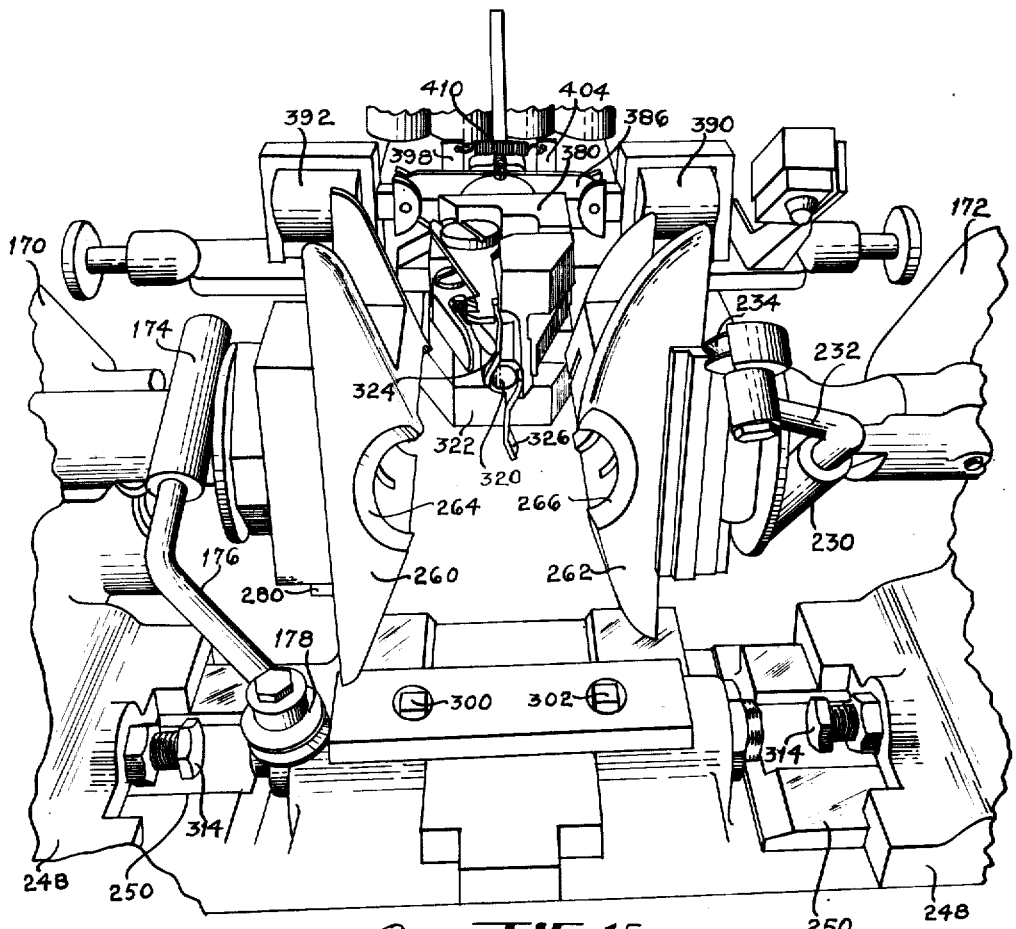

Figure 15 is a front elevational view of the coil winding machine, disclosing the chucks used in supporting the armature or form upon which the coils are wound and the fliers in the position these assume at the time the winding of a pair of coils has been completed.

Figure 16 is an enlarged detail view of the armature support and the parts associated therewith.

Figure 17 is a top plan view of the armature shaft support and the hooks for engaging the leads.

Figure 18 is a side elevational view of the parts disclosed in Figure 17.

Figure 19 is a cross sectional view taken substantially on the line 19—19 of Figure 18.

Figure 20 is a cross sectional view of a gear used in driving the fliers.

Figure 21 is a fragmentary view of the flier reversing mechanism and the clutch for disconnecting the same.

Figure 22 is another fragmentary view of a portion of the device disclosed in Figure 21.

The coil winding machine consists broadly of a main clutch and brake mechanism; a control mechanism therefor; odd slot interrupter mechanism; chucks for supporting the armature or form to be wound; indexing mechanism; a pair of fliers for laying the wire in the slots to form the coils; reversing mechanism for reversing the fliers; mechanism for forming a long lead loop between some of the coils; and other mechanism for forming a short lead loop between other coils. These parts and the associated mechanism will now be described in detail.

*Main clutch and brake mechanism*

The main clutch and brake mechanism, as clearly shown in Figure 2, includes a V-belt pulley 20 driven by a V-belt 22 from a suitable source of power, such as an electric motor, not shown. The V-belt pulley 20 is mounted upon the roller bearings 24 for free rotation upon a drive shaft 26. This pulley 20 is provided with a clutch face 28 cooperating with a clutch member 30 splined upon the drive shaft 26, so as to drive the shaft when the clutch member 30 is pressed against the clutch face 29. A helical spring 32 is mounted between the pulley 20 and the clutch member 30, biasing these two members apart. Clutch member 30 is also provided with a brake lining 34 adapted to engage a friction surface 36 on the main frame or housing 38.

*Control mechanism for main clutch and brake*

The hub 40 of the clutch member 30 is seated against a bearing 42 mounted for axial movement in an apertured boss 44 integral with the housing 38. A collar 46 surrounds the shaft 26 and is actuated by a bifurcated member 48 keyed to a shaft 50 journalled in the housing 38 and actuated by a clutch and brake control lever 52, shown in dot-dash in Figure 2 and shown in full line position in Figures 1 and 4 to 8 inclusive.

In the absence of a force actuating the lever 52 downwardly, the compression spring 32, positioned between the pulley 20 and the clutch member 30, actuates the lever 52 in a clockwise direction, as viewed in Figures 5 to 8 inclusive, and applies the brake to shaft 26. As best seen in Figure 1, the lever 52 consists of one part 52a keyed to the shaft 50 and a second long lever 52b adjustably mounted by means of a set screw 54 with respect to 52a. This is to properly align the lever 52b with respect to the position of the shaft 50 and the position of the clutch member 30. When the parts have been properly adjusted, a set screw 58 is tightened, so as to rigidly hold members 52a and 52b in adjusted position. Lever 52, near its outer end, carries a pin 60 and is provided with an aperture receiving a control rod 62. A lever or latch member 64 mounted upon a stubshaft 66 is provided with a detent 68 adapted to engage the pin 60.

When the control rod 62 is actuated from the position shown in Figure 4 into the position shown in Figure 5, a collar 61 rests on a stop 63 connected to a shaft 65 journalled in a bracket 67 integral with the base for the housing 38. When the control rod 62 rests upon the stop 63, the brake is disengaged, so that the mechanism actuated by the drive shaft 26 may then be rotated independently of the brake mechanism and independently of the motor drive. This permits the use of other drive mechanism for actuating the mechanism driven by the shaft 26.

As may be seen by referring to Figures 5 and 6, a lever 69 pivoted at 71 to a bracket 73′ is positioned between the collar 61 and a compression spring 75 positioned on the control rod 62. The outer tip 76 of the lever 69 is pivotally mounted so as to have a free swinging movement in one direction and a positively driven movement in the opposite direction. A switch 77 has a switch arm 78 mounted in the path of the outer tip 76 of the lever 69, so that as the lever 69 moves from the position shown in Figure 4 into the position shown in Figure 5, the outer tip member 76 flexes about its pivot, so as not to actuate the switch arm 78. However, by actuating the control rod 62 upwardly a slight distance from the position shown in Figure 5 to the position shown in Figure 4, the outer tip 76 of the lever 69 actuates the switch arm 78 so as to energize an electromagnet, that has not been shown, actuating member 63 out of the path of the collar 61, permitting the control rod 62 to move into the position shown in Figure 6. When the control rod 62 is in the position shown in Figure 6, the winding operation is resumed, as will appear more fully when describing the mode of operation of the machine.

By actuating the rod 62 downwardly from the position shown in Figure 5 into the position shown in Figure 6, the detent 68 is actuated into position so as to engage the pin 60. The rod 62 supports a collar 70 engaging a pin 72 tensioning a spring 74 that biases the latch member 64 in a counterclockwise direction, as shown in Figure 6, so as to actuate the detent 68 into engagement with the pin 60. As may best be seen by referring to Figure 5, the collar 70 engages the pin 72 in a pivotally mounted bell crank shaped member 73 at the time that the brake is released, so as to cause the spring 74 to exert a pressure tending to rotate the member 73 in a counterclockwise direction, as viewed in Figure 9.

As the rod 62 is actuated downwardly, the member 73 is biased in a clockwise direction, as viewed in Fig. 9, and out of the path of the plunger 120. The control rod 62 is actuated downwardly by a hydraulic cylinder or electromagnet actuated by means of a control switch starting the operation of the coil winding machine. When the detent 68 engages the pin 60, the clutch member 30 engages the pulley 20, so as to cause this pulley to drive the shaft 26 and the parts associated therewith through a suitable gear mechanism, which has not been shown. As may best be seen by referring to Figure 20, the shaft 26 drives shafts 80 and 81 in opposite directions by means of the pinions 492, 493 and 494.

As may best be seen by referring to Figures 4 to 10, the shaft 80 journalled in the housing 38 and used in driving the fliers, as will appear more fully later, has fixedly mounted thereon a pair of cams 82 and 84. The shaft 80 rotates in synchronism with the fliers, as will appear more fully later.

A cam follower 86, mounted upon a pintle 88 supported upon the bifurcated end of a bracket member 90, cooperates with either the cam 82 or the cam 84 to release the clutch at the proper time. The bracket member 90 is pivoted upon the shaft 66 and is biased in a counterclockwise direction, as viewed in Figures 4 to 8, by a tension spring 92. The bracket member 90 supports a pin 94 that is normally engaged by a detent 96 carried on a lever 98 pivoted upon a pivot 109 fixed to the housing 38. The lever 98 has integral therewith an arm 102 supporting a pin 104. The lever 98 is biased in a clockwise direction, as viewed in Figures 4 to 8, by a tension spring 106. When the detent 96 engages the pin 94, the bracket member 90 is held in a position such that the cam follower 86 does not come in contact with either one of the cams. The lever 98 is rotated in a counterclockwise direction by a cam 110 fixedly secured to the shaft 112. If, for example, the fliers used in laying the wires in the slots so as to form the coils are to lay 16 loops for each coil, the fliers will rotate 16 times while the cam 110 makes one revolution. When the cam 110, which rotates in a clockwise direction, as viewed in Figures 4 to 8, engages the pin 104, the detent 96 is moved out of engagement with the pin 94, permitting the tension spring 92 to actuate the bracket member 90 in a counterclockwise direction, as viewed in Figures 4 to 8, into the position shown in Figure 9. The cam follower 86 will then contact either the cam 82 or the cam 84, depending upon the position of the cam follower.

In Figure 10 the cam follower 86 is shown in contact with the cam 82. When the cam 82 or the cam 84, as the case may be, actuates the cam follower 86 in a clockwise direction, as shown in Figures 4 to 8, the plunger 120 engages an arm 122 of the bell crank member 73 mounted upon the lever 64. While the windings or layers of a coil are laid in position the control rod 62 is raised, thereby releasing the force applied to the pin 72, so as to cause the tension spring 74 to rotate the bell crank member 73 in a counterclockwise direction, as viewed in Figure 9. The arm 122 is then moved into the path of the plunger 120. From this it can readily be seen that as the cam follower 86 is actuated in a clockwise direction, as viewed in Figures 4 to 8, the latch member or lever 64 will be actuated in a clockwise direction, so as to cause the detent 68 to clear the pin 60, permitting the compression spring 32 to actuate the clutch member 30 from engagement with the pulley 20 and so as to apply the brake, thereby arresting the movement of the parts driven by the clutch. A set screw 124 threadedly engaging a capping member 126 is used in adjusting the position of the plunger 120, so as to cause the clutch to be released and the brake applied at the proper time. During the time that the cam 110 is in engagement with the pin 104, a pin 130, carried by the outer end of the lever 98, releases a microswitch 132, the function of which will be described more fully later. When the latch member 64 is moved out of engagement with the pin 60, an arm 134 moves downwardly, as viewed in Figures 4 to 8, so as to open the microswitch 136, as clearly shown in Figures 4 and 5. Normally the microswitch 136 has no function other than to intercept the operation of the winding machine in the event member 68 for some reason or the other fails to properly engage the pin 60.

The cam follower 86 is mounted for axial movement on the pintle 88. A bifurcated lever 140, as best seen in Figure 9, pivotally mounted to the bracket member 90 at 142, is provided with a pin 144 engaging an arcuate slot in member 146. Member 146 is pivotally mounted upon a shaft 148 supporting a crank arm 150 provided with a pin 152 supporting a spring 154 extending through a pin 156 in member 146. The shaft 148 may be rotated in a clockwise direction, as viewed in Figure 9, by a crank arm 160 engaging an armature 162 actuated by an electromagnet 164. Whenever the electromagnet 164 is energized, member 146 is actuated in a clockwise direction, as viewed in Figure 9, so as to shift the cam follower from the cam 82 to the cam 84. This electromagnet 164 is energized by a cam actuated micro-switch, not shown, that is controlled by a cam that makes one revolution during a complete armature winding cycle. The armature shown in Figure 14 has 11 slots. One side of each of two coils are placed in each slot. Thus, 11 coils are required for the completely wound armature. When winding the armature by this machine, one coil is first wound. The remaining 10 coils are wound two at the same time. Thus, five pairs of coils are wound. When the fifth pair of coils is being wound, the electromagnet 164 is energized to shift the cam follower 86 from the cam 82 to the cam 84.

It is to be noted that the two cams 82 and 84 are 180° out of phase. When in the process of winding an armature, at the end of the first coil or each pair of succeeding coils, with the exception of the last pair of coils on the armature, the fliers are stopped in a predetermined position, as will appear more fully later. When the armature has been completely wound, the cam follower 86 is then actuated so as to contact the cam 84, so as to stop the fliers in another position 180° out of phase with the first position referred to above. Normally, the lever 140 is biased in a counterclockwise direction, as viewed in Figure 9, by a tension spring 166, shown in Figures 4 to 8 inclusive, but omitted from Figure 9 for the purpose of clearness.

*Fliers for laying wires in slots*

The shaft 81 extends from the housing 38 and has one end of the shaft projecting into a housing 170. The shaft 80 has one end projecting into a housing 172. The end of the shaft 81 projecting into the housing 170 drives through suitable gears a spinner or flier 174, best seen in Figure 15. This flier 174 includes a rod 176 and the spool or pulley 178 over which the wire passes. The end of the shaft 80 projecting into the housing 172, as best seen in Figure 11, projects into a tubular sleeve or shaft 180 that is optionally connected for driving connection to the shaft 80 by an interrupter mechanism, which will now be described. The arrangement of the gears 492, 493 and 494 is such that the shafts 80 and 81 are driven in opposite directions. When winding only one coil, only one flier is used. When winding two coils simultaneously, two fliers are used. When only one flier is used, it is necessary to disconnect the other flier from the driving mechanism. This has been accomplished by an odd slot interrupter mechanism, that will now be described.

*Odd slot interrupter mechanism*

This interrupter mechanism includes member 182 keyed to the tubular sleeve or shaft 180. Member 182 is provided with a plurality of radially disposed apertures 184, 186, 188, 190 and 192, as best seen in Figure 12. It is to be noted that there are five of these apertures, the apertures being unequally spaced. An interrupter member 194 is provided with notches 184a, 186a, 188a, 190a and 192a, spaced so as to register with the apertures 184, 186, 188, 190 and 192 when in one position and only in one relative position with respect to member 182. A plurality of notched pins 200, 202, 204, 206 and 208, one for each of the apertures 184, 186, 188, 190 and 192, project into these apertures and are supported upon an annular member 210 keyed upon a plurality of bolts 212 and spring urged away from members 182 and 194 by compression springs 214, as best seen in Figures 11 and 12. Each of the pins 200, 202, 204, 206 and 208 is provided with an inwardly directed notch 216. The distance from the center of the shaft 80 to the bottom of each notch 216 is greater than the radius of member 194 splined to the end of the shaft 80. When member 210 is in the position shown in Figure 11, the notches 216 are located outwardly beyond member 194. A hydraulic cylinder 220, provided with a piston rod 222 functioning as a plunger, engages the boss 224 of member 210. When fluid is supplied to the piston in the cylinder 220 to actuate the piston rod or plunger 222 to the left, as viewed in Figure 11, the notches 216 will be caused to move towards the left, as viewed in Figure 11, to a position such that the notches 216 clear member 194. It can readily be seen that when the notches are moved into a position so as to clear member 194, member 194 rotates with the shaft 80 without rotating member 182 and without rotating the tubular sleeve 180.

The tubular sleeve or shaft 180 drives a gear not shown that meshes with another gear, not shown, that actuates a flier or spinner 230 seen in Figure 15. This spinner 230 includes an arm 232 and the spool or pulley 234 over which the wire passes. From this arrangement, it can readily be seen that when the piston in the cylinder 220 actuates the plunger 222 to the left, as viewed in Figure 11, and the shaft 80 is rotated, the spinner 174 will continue to rotate, but the spinner 230 remains idle. At the time the spinner 230 remains idle, a brake shoe 240 actuated by a hydraulic piston 242 engages the periphery of member 182 so as to prevent the flier or spinner 230 from rotation. When the plunger 222 moves into the position shown in Figure 11, the compression springs 214 will actuate member 210 into the position shown in Figure 11 only when all of the notches in members 200, 202, 204, 206 and 208 register with the notches 184a, 186a, 188a, 190a and 192a respectively. As soon as these register, the spring 212 snaps members 210 into the position shown in Figure 11, thereby causing members 200 to 208 inclusive to engage member 194, so as to cause member 182 and the tubular shaft driven thereby to actuate the flier 230.

*Chucks for supporting the armature or form to be wound*

The housings 170 and 172 are mounted upon slidable members 248 engaging dovetailed guides 250 for adjustment so that members 248 are movable toward and away from each other and thereby the housings 170 and 172 are movable toward and away from each other, as best seen in Figure 15. The housing 170 supports a chuck member 260 and the housing 172 supports a chuck member 262. These chuck members are nonrotatably mounted in fixed spaced relation from the housings 170 and 172 respectively. As may best be seen by referring to Figure 14, each of the chuck members 260 and 262 is provided with arcuate surfaces 264 and 266 adapted to engage an armature 270.

*Armature indexing mechanism*

Within the chuck members 260 and 262 are located pawl members 272 and 274 respectively, pivoted at 276 and 278, the pivots being mounted upon slidable plungers 280 and 282 respectively. The pawl members 272 and 274 are urged into contact with the armature by springs 284 and 286. The plungers 280 and 282 are biased downwardly, as viewed in Figure 14, by compression springs 288 and 290, the downward movement causing set screws 292 and 294 to engage the pawl members 272 and 274, so as to move the pawl members out of contact with respect to the rotor when the rotor has been rotated into registry, that is, into the proper position so as to properly align the slots to be wound. Whenever it is found desirable to rotate the rotor a distance of one notch in a counterclockwise direction, as seen in Figure 14, a plunger 300, actuated by a hydraulic cylinder 304, as best seen in Figure 13, is raised upwardly, so as to engage the plunger 280, thereby actuating the pawl member 272 upwardly to cause the pawl to engage a succeeding tooth and then as the plunger 300 is lowered into home position, as best seen in Figure 14, the spring 288 actuates the plunger 280 downwardly, causing the pawl member 272 to rotate the armature 270 through a distance equal to the pitch of the teeth. However, in order to effect registry of the armature, it is necessary to release the chuck members by separating the chuck members a short distance.

As may best be seen by referring to Figure 13, this has been accomplished by means of a cam surface 306 in the side of the plunger 300 engaging a cam follower 308 actuating a plunger 310 against a compression spring 312, the plunger 310 engaging a set screw 314 properly adjusted in member 248. As the plunger 300 is raised, the cam surface 306 actuates the cam follower 308, so as to move member 248 outwardly and therewith the housing 170 and the chuck 260. A like arrangement is provided for actuating the armature in a clockwise direction, as viewed in Figure 14, by a plunger 302 engaging the plunger 282.

In winding an armature of the commutator type and also other types of armatures, it is necessary to make provision for leads extending from the ends of the coils to commutator segments or whatever the structure happens to be. This has been accomplished by providing loops between the coils.

*Mechanism for forming lead loops*

When fine wire is used in winding coils, the current density in the windings of the armature may be too great if all the current passes through the windings. In order to hold the current density down to the desired quantity so as to reduce heat losses, the center of each coil is tapped so as to reduce the current flowing through the windings into one-half the total current generated in the coil. This is accomplished by providing a loop between the two halves forming a coil.

In some types of armatures two half coils are laid in the same pair of slots. That being the case, it is necessary in some manner to identify the lead loops that connect the coils in the same slot from the lead loops connecting coils of adjacent slots. One method of identifying these two sets of lead loops is to make one set of lead loops longer than the other set of lead loops. If, for example, the short lead loops connect a pair of halves really forming two coils located in the same slot, then long lead loops are used to connect the coils located in adjacent slots, or vice versa.

The end of the shaft supporting the commutator projects into an aperture 320 in a support 322. A pair of wing-like members, or loop or lead stripping members 324 and 326 extend in opposite directions from the aperture 320. The lead stripping members 324 and 326 are pivotally mounted at 328 and 330 to the support or frame member 322. Compression springs 332 and 334 bias the lead stripping members 324 and 326 toward each other. The support 322 has pivotally mounted thereon two sets of hooks 340, 342, 344 and 346. The hooks 340 and 342 are of equal length. The hooks 344 and 346 are also of equal length, but shorter than the hooks 340 and 342. The hooks 340 and 344 are pivotally mounted upon a pivot 348 and the hooks 342 and 346 are pivotally mounted upon a pivot 350. The hook 340 is provided with an extension 352 and the hook 344 is provided with an extension 354. The extension 352 is aligned with a pin 356 mounted in a floating member or sliding support 360 mounted for sliding movement in a guide way formed by the support 322. A pin 362 is aligned with the projection or extension 354 laterally disposed with respect to the hook 344. A similar arrangement is provided for the hooks 342 and 346 mounted on the under side of the support 322 and the floating member 360, as viewed in Figure 17.

The two wing-like members 324 and 326 are moved outwardly in opposite directions from the armature shaft by means of a plunger 372 engaging the sliding support 360, causing pins 364 and 366 to engage laterally disposed projections 368 and 370 of the wing-like members 324 and 326, so as to cause the wing-like members to spread outwardly and in opposite directions, in that member 360 is mounted for movement in the frame member 322. When these wing-like members 324 and 326 move outwardly, the loops, not shown, are deflected outwardly out of the path of the wires being wound in the slots, as will appear more fully later.

The hooks 340, 342, 344 and 346 are moved outwardly either individually or in pairs, depending upon the relative position of an actuating member 380. This actuating member 380 is mounted upon a tubular sleeve 382 surrounding the plunger 372, as best seen in Figure 19. An eccentric pin 384 is connected to an armature member 386 that may be actuated to the right, as viewed in Figure 19, by an electromagnet 390, and to the left, as viewed in Figure 19, by by an electromagnet 392. When the armature member 386 is actuated to the right, as viewed in Figure 19, actuating member 380 is rotated in a clockwise direction. When the armature member is actuated to the left, actuating member 380 is rotated in a counterclockwise direction. The armature member 386 supports a pair of pins 394 and 396, the pin 394 engaging an L-shaped bracket 398 pivoted upon a pivot 400 in a slidable base 402. The pin 396 engages an L-shaped bracket 404 pivoted at 406 to the sliding base 402. The upper ends of bracket members 398 and 404 are interconnected by a tension spring 410. It can readily be seen that when the armature member 386 is moved to the right, as viewed in Figure 19, the L-shaped bracket 404 is also moved to the right; but the L-shaped bracket 398 is precluded from moving to the right, in that the base of the L-shaped member 398 engages the sliding base 402. In other words, bracket member 404 can be rotated in a clockwise direction from the position shown in Figure 19 and bracket member 398 can be rotated in a counterclockwise direction from the position shown in Figure 19 about their respective pivots; but member 404 cannot rotate in a counterclockwise direction and member 398 cannot rotate in a clockwise direction from their respective full line positions. Thus, member 404 moves to the right when the electromagnet 390 is energized and member 398 moves to the left when the electromagnet 392 is energized. Whenever these electromagnets are de-energized, the compression spring 410 restores the armature member 386 to the home position shown in Figure 19. At no time are both electromagnets 390 and 392 energized simultaneously. Only one of these is energized at a time.

Actuating member 380 is provided with a pair of diametrically disposed recesses 420 and 422. In addition thereto, actuating member 380 is provided with a recess 424 and a recess or aperture 426. When actuating member 380 is actuated forwardly, as viewed in Figure 19, or to the right as viewed in Figure 18, it actuates the pins 356 and 362, causing the hooks 340 and 344 to move laterally or upwardly, as viewed in Figure 17. At the same time, actuating member 380 engages the pins 357 and 363 to actuate these pins forwardly, as viewed in Figure 19, or to the right, as viewed in Figure 18, to actuate the hooks 342 and 346 toward the observer, or downwardly as viewed in Figure 17. In the event the armature member 386 is actuated to the right, as viewed in Figure 19, so as to actuate or rotate actuating member 380 in a clockwise direction, as viewed in Figure 19, a slot 420 will register with the pin 362 and the slot 426 will register with the pin 363. This will cause the hooks 340 and 342 to move outwardly beyond the wings 324 and 326; but the hooks 344 and 346 will not move outwardly, for the reason that the pins actuating these particular hooks will drop into the recesses 420 and 428. Thus, only one pair of hooks is moved outwardly when actuating member 380 is rotated in a clockwise direction, as shown in Figure 19, whereas all of the hooks are rotated outwardly when actuating member 380 is actuated to the right, as viewed in Figure 18, when the armature member 386 is in the home or neutral position.

When the electromagnet 392 is energized to actuate the armature member 386 to the left, as viewed in Figure 19, the pins 356 and 362 will then register with the apertures 424 and 426. When this takes places, the pins 357 and 363 will actuate the hooks 342 and 346 outwardly beyond the wing 324; but the hooks 340 and 344 will not move, in that the pins 355 and 362 drop into the recesses 424 and 426 respectively, so that member 380 will not actuate these pins. Actuating member 380 is actuated to the right, as shown in Figure 18, by means of a pin 440 mounted in an extension 442 upon the slidable base 402. The pin 440 is aligned with a plunger or piston 444, fluid driven by means of a piston in the cylinder 446. The wings 324 and 326 are spread by a lever 450 pivotally mounted at 452 and actuated by a plunger 454 connected to a piston in the cylinder 456. It can readily be seen that as the plunger 454 is actuated to the left, as viewed in Figure 18, the lever 450 will be rotated to the right, so as to actuate the plunger 372 to thereby actuate the wing-like members 324 and 326, so as to spread the lead loops, not shown.

When the clutch member 30 is in neutral position, that is, out of contact with the pulley 20 and without contact with the brake surface 36, the fliers and the mechanism associated therewith are free to rotate. During the normal winding operation at the end of a coil, with the exception of the last coil, the fliers will stop in substantially the position shown in Figure 15.

*Reversing mechanism for reversing the fliers*

In order to form a loop at the end of a coil, the fliers are actuated in a reverse direction through an angle of substantially 180°. In order to get the proper phase relation of the windings, the fliers are actuated in opposite directions while winding coils. That being the case, the flier 230 is actuated upwardly and rearwardly from the position shown in Figure 15 through substantially 180° and the flier 174 is actuated downwardly and rearwardly through substantially 180° by a mechanism which will now be described.

The shaft 80 has rotatably mounted thereon a pinion 460 that is engaged by a toothed rack 462 hydraulically driven from a hydraulic cylinder, not shown, which is used in actuating the rack upwardly through its upward stroke and then in a reverse direction through its downward stroke. As soon as the rack 462 is actuated upwardly, a bracket 464 attached thereto is also moved upwardly. This bracket 464 engages a bell crank member 466 provided with a detent 468 and pivoted upon a pin 470. The bell crank member 466 is biased in a clockwise direction, as viewed in Figure 21, by a torsion spring 477, shown in Figures 20 and 22. The pin 470 forming a pivot for the bell crank lever 466 is mounted upon a bracket 472 fixedly secured to the pinion 460. That being the case, as rack member 462 is raised upwardly, as viewed in Figure 21, the bracket 472 together with the pinion 460 begins to rotate in a counterclockwise direction. The set screw 474 is adjusted to a position such that as the rack 462 is raised, the set screw 474 carried by the bracket 464 moves out of engagement with the bell crank lever 466, which is biased in a clockwise direction by the spring 477, causing the detent 468 to drop into a notch 480 in an annular member 482 keyed to the shaft 80. Thereby, the shaft 80 will be rotated in a counterclockwise direction shortly after the rack 462 begins to move upwardly, as viewed in Figure 1.

It can be readily seen from an inspection of Figure 20 that the differential consists of the bevelled gears 493 keyed to the shaft 80, 492 keyed to the shaft 26 and 494 keyed to the shaft 81. This gear arrangement will cause the fliers to move in a reverse direction providing the pins 200 to 208 to engage the interrupter member 194. When the rack 462 is actuated upwardly into a position such that the switch actuating member 500 closes the switch 502, an electromagnetic control for the piston 446 is actuated so as to actuate member 380 to the right, as viewed in Figure 18, causing one or more of the hooks 340 to 346 to move outwardly into the path of the wires carried by the fliers which have now been reversed to a position such that the fliers 230 and 174 have moved beyond the position of the hooks. As one or more of these hooks is projected outwardly and the rack 462 is actuated downwardly, as viewed in Figure 1, the fliers will reverse so as to move back into the position shown in Figure 15; but during this reverse movement the wires extending from the fliers to the armature member will engage their respective hooks so as to form a loop in the wire, as will appear more fully during the description of the mode of operation of the coil winding machine.

*Mode of operation*

This machine is very flexible, in that it may be used in automatically winding armatures having windings of various patterns. For example, it may be used in winding armatures with an even number of slots or it may be used in winding armatures having an odd number of slots. It may be used in winding armatures wherein each coil is provided with a lead extending from each end of the coil. It may also be used in winding armatures wherein the coils are made from fine wire requiring one or more taps so as to reduce the current density through the turns.

For the purpose of illustration, the coil winding device will be described as winding an armature having an odd number of slots, wherein the coils are made of fine wire requiring center taps. If a commutator is used, the armature is placed with the commutator end of the shaft in the aperture 320 shown in Figure 15. The two chucks 260 and 262 are then advanced toward each other, so as to snugly hold the armature in position. The fliers 174 and 230 are normally positioned 180° out of phase from the position shown in Figure 15. Upon the winding machine being started, either the plunger 300 or the plunger 302, depending upon the particular setting, is actuated upwardly, so as to cause the pawl member 272 or the pawl member 274, depending upon the particular plunger that is being used, to engage a tooth in the armature to rotate the armature into such a position that one slot registers with the guiding surfaces of the chucks 260 and 262. The two slots that are located opposite the single slot each has a margin thereof flush with the curved wire guiding surface of the chucks 260 or 262, as the case may be, as clearly shown in Figure 14. By indexing the armature before initiating the first winding, the work of the operator is reduced, in that it is merely necessary for the operator to insert the armature with the shaft projecting into the aperture 320, then close the chucks 260 and 262 in readiness for the winding operation. It is not necessary for the operator to carefully adjust the armature into registry. This is done automatically.

For some patterns of armature windings wherein an odd number of slots is found in the armature, requiring an odd number of coils, the odd numbered coil is first wound and thereafter the coils are wound in pairs. Furthermore, for some types of patterns, no lead loop is formed when initiating the winding operation of a flier. That is, the flier 174, used in winding the first coil, is not used in producing a lead loop when initiating the winding of the first coil. Likewise, when the first pair of coils are wound, after the first coil has been wound, the coil wound by the flier 230 is not used in producing a lead loop, in that the ends of the wires extending beyond the armature are clamped in a suitable clamping mechanism in front of the winding machine and are used in forming the first terminals of these coils. Also, in some patterns, no lead loop is formed when the two final coils have been wound to complete the winding operation of the armature.

Due to the fact that there are an odd number of slots in the armature, an odd number of coils are required. That being the case, the coil winding machine has been so adjusted that upon initiating the winding operation, the piston and the cylinder 220 cause the piston rod 222 to engage a boss 224 of annular member 210, so as to actuate the notched pins 200 to 208 inwardly, whereby interrupter member 194 registers with the slots 184a to 192a. At the same time, the piston and the cylinder 242 applies the brake 240 to the periphery of member 182, so as to prevent member 182 from rotating. By this arrangement, it can readily be seen that the flier 230 will not rotate, in that this flier is disconnected from the driving mechanism. The flier reversing mechanism is now ready to operate. The notch 480 is now 180° out of phase with the position shown in Figure 15. That being the case, the pawl 468 will not engage the notch on the up stroke. At or near the end of the up stroke, the detent 468 drops into the notch 480, so as to return the flier 174 to the front position shown in Figure 15. By this time the clutch member 30 has been forced into contact with the pulley 20. This is accomplished by actuating the rod 62 downwardly. As soon as the clutch member 30 engages the pulley 20, the winding operation begins, in that the flier 174 rotates to wind a coil in the top slot and the lower slot located adjacent member 260, that is, the left slot of the two lowest slots. No lead loops are formed when initiating the winding of the first coil. That being the case, the hooks 340 and 342 remain in the home position, so as to be located out of the path of the wires.

The shaft 112 supporting the cam 110 has been connected by gears, such that the shaft 112 will make one revolution when the desired number of turns have been wound to complete one-half of a coil. If, for example, a coil has 32 turns, there will be 16 turns in one-half of a coil or 16 coil windings. In order to wind 16 turns, the flier 174 must make 16 revolutions. In other words, the gear ratio between the driving mechanism for the flier 174 and the shaft 112 is 16 to 1. When the cam 110 has made one revolution, or shortly before the sixteenth revolution of the flier 174 is completed the cam 110 engages the pin 104 mounted on member 98 to thereby actuate the detent 96 out of engagement with the pin 94. This permits the cam follower 86 to drop into contact with the cam 82. The cam 82 has been so positioned that the shaft 80, rotating in synchronism with the shaft 81, makes half a revolution before the cam follower 86 actuates the plunger 120 a distance sufficiently great to actuate the latch member 64 to cause the detent 68 to clear the pin 60. As soon as the detent 68 clears the pin 60, the compression spring 32 snaps the clutch member 30 out of engagement with the pulley 20 and into engagement with the friction or brake surface 36, so as to stop the rotation of the flier 174 almost instantly and always in the same relative position.

As soon as the movement of the flier has been arrested, control rod 62 is actuated downwardly so as to cause the collar 61 to engage stop member 63, which was actuated into the position shown in Figure 5 during the winding operation, to release the brake.

Upon the brake being released, the rack member 462 begins its upward stroke, as viewed in Figure 21. Before the detent 468 drops into the notch 480, a switch 501 is closed by a switch actuating member or cam 500, causing one of the plungers 300 or 302, that are hydraulically operated, to advance upwardly and then return so as to index the armature to present adjacent slots to the winding position. Which one of the plungers 300 or 302 is used, depends upon the pattern of the windings used in winding the armature. Let it be assumed that the plunger 300 is actuated upwardly, so as to cause the armature to be rotated through a distance of one notch in a counterclockwise direction, as viewed in Figure 14. This takes place before the detent 468 engages the notch 480. As the rack member 462 is advanced upwardly, the bracket 464 is raised, so as to release the bell crank lever 466, causing the detent 468 to engage the notch 480. When this takes place, the shaft 80 is rotated in one direction and the shaft 81 in the opposite direction. The shaft 81 reverses the flier 174 through an angle of substantially 180°. As the rack 462 approaches the upper limits of its stroke, switch actuating member 500 closes the switch 502, causing the plunger 302 to move upwardly to actuate the pawl 274 into engagement with a succeeding notch in the armature so as to index the armature through the distance of one notch in a clockwise direction, as viewed in Figure 14, returning the armature to its original position. It can readily be seen that by this arrangement the wire has been wrapped around one tooth of the armature during the reverse movement of the plunger. Thus, the lead wire is anchored upon this tooth. At approximately the same time, the valve controlling the fluid supplied to the hydraulic cylinder 446 is actuated, thereby actuating the plunger 444 to the right, as viewed in Figure 13, and with it actuating member 380, causing the pins 356 and 362 to actuate the hooks 344 and 346 into the path of the wire being wound by the flier 174. When both hooks are actuated into the up position, the loop will be formed on the shorter hook 346.

As soon as the rack 462 has reached its up position, it begins the reverse stroke, reversing the rotation of the flier 174 so as to actuate the flier into the position shown in Figure 15. When the rack 462 comes to rest in the position shown in Figure 15 after it has been reversed and re-reversed through 180°, the winding operation is then resumed by momentarily raising the control rod 62 from the position shown in Figure 5 into the position shown in Figure 4, the upward movement of the rod causing member 76 to actuate the switch arm 78, thereby energizing the electromagnet that has not been shown, so as to actuate stop member 63 out of the path of collar 61. The rod 62 is then lowered, so as to actuate the control lever 52, releasing the brake, which may have been momentarily applied, actuating the lever 52 downwardly a distance sufficient to permit the detent 68 to engage the pin 60. The cam follower 86 upon being actuated by the cam 82, has moved the bracket 90 a distance sufficient to permit the detent 96 to engage the pin 94. When the detent 96 engages the pin 94 and the detent 68 engages the pin 60, the switches 132 and 136 are closed. If, for some reason, the detents 96 and 68 do not engage their respective pins, one of the switches or both of the switches 132 and 136 will remain open, thus causing the interruption of the operation of the coil winding machine.

When the two detents engage their respective pins, the winding operation resumes, laying another 16 turns of wire into the same pair of slots. When 16 layers or turns have been laid into the slots, the shaft 112 is rotated through another revolution, the cam 110 engaging the pin 104 to cause the detent 96 to release the pin 94, permitting the cam follower to drop into contact with the cam 82. The cam 82 is then approximately 180° out of phase with the position shown for the cam 82 in Figures 6 and 7. When the cam is rotated into the position shown in Figures 6 and 7, the cam follower 86 again causes detent 68 to clear the pin 60, thereby releasing the clutch and suddenly applying the brake, arresting the movement of the flier 174 in the position shown in Figure 15.

The flier reversing mechanism is then again set in motion. The rack 462, beginning its upward movement, closes the switch 501, causing the plunger 300 to be projected upwardly, actuating the cam follower 308, so as to release the chucks slightly, to permit the armature to be indexed. Upon the return of the plunger 300, the spring actuates plunger 280 downwardly, so as to cause the pawl 272 to actuate the armature in a counterclockwise direction through a distance of one tooth and one notch. When the flier 174 approaches 180° in the reverse direction, so as to be in a position substantially 180° opposite from the position shown in Figure 15, the electromagnet 392 is energized so as to rotate actuating member 380 to a distance such that the pins 362 and 356 register with the apertures 424 and 426, to make these two pins inactive. The leading wire of the first coil wound by the flier, in some winding patterns as explained above, is not used in forming a loop, in that the end of the wire projects outwardly from the opposite end of the armature. After the coils are all wound, the lead is then laid in an adjacent slot for connection to the terminal, whether it be a commutator segment or a slip ring. Both the pins 363 and 357 are then actuated upon the fluid being supplied to the cylinder 446, to actuate the plunger 444 to the right, as viewed in Figure 18, actuating member 380 to the right, causing both of the hooks 342 and 346 to be projected into the path of the wire being wound by the flier 174. The hook 342 already has a loop thereon, held there from the time the first coil was wound. The hook 346 being actuated into the path of the wire being wound, forms a loop. There are now two loops. When the winding of the succeeding coil is about to be initiated, the cylinder 456 actuates the plunger 454 to actuate the lever 450 which actuates the rod 372 to cause the loop deflectors 324 and 326 to spread outwardly, stripping the leads from the hooks 342 and 346, which hooks have been previously retracted. The armature is not indexed, but remains in the indexed position so as to present a new slot at the top of the armature in the winding position, as viewed in Figure 14. The flier 174 is returned to the home position.

Before the last reversal of the flier 174 took place, the fluid in the cylinder 220 has been released, so as to permit the spring 215 to actuate member 210 to the right, as viewed in Figure 11, thereby causing the notched pins 200 to 208 to engage the proper notches in member 194, so as to cause the flier 230 to be engaged and driven. This takes place at the time that the flier 174 is in the reversed position shown in Figure 15, in that the flier 230 was arrested in its movement in a position 180° out of phase with the position shown in Figure 15.

The flier 230 is actuated with the flier 174 from the reverse position into the home position shown in Figure 15, in that the interrupter has now been used in connecting the flier 230 to the drive shaft 80. From now until the completion of the winding of the coil, both fliers operate simultaneously, but rotate in reverse directions. The fliers rotate at the same speed, so as to make the same number of revolutions in the same period of time. Upon 16 turns being laid, the flier 174 placing 16 turns in the upper slot and 16 turns in the lower left exposed slot and the flier 230 placing 16 turns in the upper slot and 16 turns in the lower right exposed slot, the cam 110 engages the pin 104, which in reality is a cam follower, so as to release the bracket 90, permitting the cam follower 86 to drop into engagement with the cam 82. When the cam 82 actuates the cam follower 86, so as to release the clutch engaging lever 52, the brake is applied, arresting the fliers 174 and 230 in the position shown in Figure 15. The armature is then indexed, the fliers reversed through 180°, the electromagnet 290 energized, so as to actuate member 380 in a clockwise direction, as viewed in Figure 19, and then the piston or plunger 444 actuated, so as to actuate member 380 to the right, as viewed in Figure 18, projecting the hooks 340 and 342 into the path of the wires.

The armature is then indexed in the reverse direction, so as to allow the fliers to wind the second coil in the unexposed slots. The fliers are re-reversed, a lead loop is formed as the center tap of the coils, the hooks retracted and the winding operation resumed, so as to wind the second set of coils or the second half of each coil located in the exposed slots, the fliers continuing to rotate until 16 turns have been laid in position, the cam 110 engaging the pin or cam follower 104 to release the bracket 90, permitting the cam follower 86 to engage the cam 82, the cam 82 actuating the cam follower 86 so as to trip the clutch lever arm 52 to again apply the brake, arresting the fliers in the position shown in Figure 15.

The armature is now indexed, the fliers reversed and upon the fliers being reversed the hooks project into the path of the wires from the fliers. The fliers are then re-reversed, without returning the armature to the initial position. The fliers, upon being re-reversed into the position shown in Figure 15, are now ready to resume the winding of coils in the new set of slots. The hooks are retracted, the lead loop deflectors 324 and 326 spread so as to actuate the loops held by the hooks out of the path of the fliers in readiness for the succeeding winding operation. These cycles are repeated until before the cam 110 engages the pin 104. During the winding of the last set of coils to complete the windings on the armature, the cam follower 86 is actuated by the electromagnet 164, so as to be aligned with the cam 84. Then, when the cam 110 engages the pin 104, so as to trip the bracket 90, the cam follower 86 drops into engagement with the cam 84, causing the fliers to stop in a position substantially 180° out of phase from the position shown in Figure 15. This is to cause the fliers to be locked in a position to permit the removal of the armature and the loading of a new armature core, the armature being laid with the leads positioned in a holder, not shown, so that the wires extend from one armature to the succeeding armature when the winding operation begins on the succeeding armature. It is merely necessary for the operator to position the armature core to be wound in position as described above, to initiate the operation of the machine so as to repeat the cycles described.

When the new armature is being wound, the operator severs the lead from the previously wound armature and deposits the wound armature upon a conveyor or in a receptacle, as the case may be. These operations are continued. The period of time required to wind an armature is comparatively short. The armatures are always uniformly wound.

In the event a different pattern is used, the cycles of operation may be varied. The number of turns in each coil may be changed by changing the gear ratio between the shaft 80 and the cam shaft 112. If, for example, there are to be 24 turns to each coil, the gear ratio would then be changed from 16-1 to 24-1. In the event no center tap is required, then this operation of the cycle is eliminated.

The above mode of operation has been described merely for the purpose of illustrating the operation of the machine. This mode of operation fits one particular winding pattern. The mode of operation, of course, will be varied to meet other types of winding patterns. For some types of work, the winding machine may be controlled manually. In the event only a few armatures of one particular pattern are to be wound, the machine may then be controlled manually, rather than taking time out to change the gear ratios and alter the various electrical circuits, et cetera.

When the armatures are wound automatically, a system of cams is used for controlling the electrical circuits similar to the system of cams shown in the Harry W. Moore application Serial No. 73,927, filed February 1, 1949, for Automatic Armature Winding Machine, now Patent No. 2,627,379.

Although the preferred embodiment of the device has been described, it will be understood that within the purview of this invention various changes may be made in the form, details, proportion and arrangement of parts, the combination thereof and mode of operation, which generally stated consist in a device capable of carrying out the object set forth, as disclosed and defined in the appended claims.

Having thus described my invention, I claim:

1. In a control mechanism for a coil winding machine wherein the windings are laid in armature slots by means of a flier driven from a suitable prime mover through a clutch, which clutch includes a pair of clutch members one of which is movably mounted, stationary brake means arranged in spaced relation from the movable clutch member, said brake means being adapted to cooperate with said movable clutch member to form a brake, said movable clutch member having three positions namely, a neutral position when the movable clutch member is out of engagement with the other clutch member and out of engagement with said brake means, said movable clutch member having clutch engaging position when it is moved into engagement with the other clutch member, and a brake position when it is moved into contact with said brake means to form a brake, a spring for urging the movable clutch member out of clutch engaging position and into contact with a stationary brake means, said control mechanism including clutch arm means for actuating the movable clutch member into clutch engaging position, a detent lever for holding the clutch arm means in a position to hold the clutch members in closed position, and means for releasing the detent, said means including a pivotally mounted bracket, a cam follower mounted on the bracket, a cam, means for rotating the cam in synchronism with the flier, a spring for biasing the bracket so as to cause the cam follower to be urged into contact with the cam, a pivotally mounted lever having a detent engaging the bracket for holding the cam follower out of engagement with the cam, a second cam, means for driving the second cam so as to cause this cam to make one revolution when the flier rotates the required number of revolutions to wind a coil, said second cam actuating the lever during the last revolution of the flier completing the winding of the coil, said second cam releasing the detent so as to disengage the bracket causing the bracket to move the cam follower into engagement with the first mentioned cam, and means connected to the bracket for actuating the first detent lever out of engagement with the clutch arm means so as to cause the clutch to be disengaged and so as to actuate the movable clutch member into engagement with the brake means to thereby arrest the movement of the flier in a predetermined position.

2. A device according to claim 1, wherein there is a third cam driven in synchronism with the flier, said third cam being substantially 180° out of phase with respect to the first mentioned cam, and means for shifting the cam follower laterally from the first cam driven in synchronism with the flier to the third cam driven in synchronism with the flier to thereby cause the flier to stop in either one of two positions substantially 180° out of phase with respect to each other.

3. A device according to claim 1, wherein a stop member is provided for holding the clutch arm means in a position where the movable clutch member is out of engagement with both the clutch and the brake to permit rotation of the flier independently of the prime mover and the brake.

4. A device according to claim 1, wherein a stop member is used in arresting the movement of the clutch arm means to hold the movable clutch member in a neutral position, and means for reversing the movement of the flier through an angle of 180° when the movable clutch member is in neutral position.

5. An interrupter mechanism for use in interrupting the operation of one flier of a coil winding machine having a pair of fliers driven from a common prime mover, said interrupter mechanism including a notched member driven by the prime mover, the notches in the notched member being unequally spaced peripherally, a second member supporting a plurality of notched pins seated in the notches of the notched member, means for supporting the notched pins, said means including a drive shaft for driving one of the fliers, means for causing a relative movement between the notched pins and the notched member, the notched pins when actuated so as to cause the notches therein to straddle the notched member disengaging the notches in the notched member to permit the notched member to rotate without rotating the notched pins and the shaft driven thereby, the pins being unequally spaced so that when the pins engage the notches in the notched member the shaft is always interconnected to the notched member in the same relative position.

6. An interrupter mechanism according to claim 5, wherein the means for causing a relative movement in one direction between the notched pins and the notched member is a fluid driven plunger and in the other direction is a compression spring.

7. An interrupter mechanism according to claim 5, wherein the notched member is splined upon a shaft and wherein the means for supporting the notched pins includes a tubular shaft surrounding the first mentioned shaft.

8. An interrupter mechanism for use in interrupting the operation of one flier in a coil winding machine having a pair of fliers driven from a common prime mover, said interrupter mechanism including a drive shaft, a notched member splined upon the shaft, the notches of the said notched member being peripherally located and unequally spaced, a tubular shaft surrounding said first mentioned shaft, an annular member fixedly attached to the tubular shaft, said annular member having a plurality of apertures, a plurality of notched pins slidingly mounted in said apertures, a supporting member having fixedly secured thereto the notched pins, said pins being unequally spaced so as to correspond to the unequal spacing of the notches in the notched member, said supporting member being axially located with respect to the annular member, compression springs for biasing the annular member and the supporting member away from each other, the notches of the pins being located in the same relative positions, means including a plunger for actuating the supporting member towards the annular member so as to cause the notches in the pins to register with the notched member, the notches in the pins providing clearance for the notched member to permit rotation of the notched member independently of the pins so that as the plunger actuates the pin supporting member to cause the notches in the pins to register with the notched member the notched member is free to rotate independently of the pins.

9. An interrupter mechanism according to claim 8, wherein the notched member is mounted for sliding and non-rotative movement upon its shaft, a compression spring for urging the notched member towards the annular member so that when the pin supporting member is actuated away from the annular member the notches in the pins actuate the notched member away from the annular member until all of the pins register with the notches, then the compression spring actuates the notched member towards the annular member as soon as the notches in the notched member register with their respective pins.

10. An interrupter mechanism according to claim 8, wherein a brake is applied to the periphery of the annular member for preventing rotation thereof, and means for applying the brake when the notches in the pins register with the notched member so as to prevent rotation of the interrupted flier.

11. An interrupter mechanism according to claim 8, wherein a brake mechanism is used for preventing rotation of the interrupted flier, means for applying the brake mechanism only when the notches in the pins register with the notched member.

12. A loop forming mechanism for use in forming loops or lead extensions at the terminals of coils that are wound by fliers rotating through a circular path, said loop forming mechanism including a pair of pivotally mounted hooks, each of said hooks being provided with a lateral extension, resilient means for holding the hooks out of the path of the wire being wound by the fliers into coils, selective means for projecting one or both hooks into the path of the wire, said selective means including a pair of pins aligned with the extensions of the hooks to rotate the respective hooks about their pivots, an actuator for actuating one or both of the pins, said actuator having an aperture in one surface thereof, said actuator having two lateral positions, in one of which positions the aperture in the actuator registers with one of said pins, means for moving the actuator laterally from one position to the other, and means for actuating the actuator in the longitudinal direction of the pins so as to push both pins into engagement with the extensions of the hooks to project both the hooks into the path of the wire when the actuator is in one lateral position, and so as to cause one pin to register with the aperture therein when in the other lateral position when one pin is actuated in response to movement of the actuator so as to project only one hook into the path of the wires used in winding the coil.

13. A loop forming mechanism according to claim 12, wherein a second pair of hooks are mounted for movement into the path of a second flier, and wherein the actuator may be moved laterally into a third position, the actuator having two additional apertures into which the pins used in actuating one pair of hooks drop when the actuator is actuated into the third position to make these hooks inoperative when the actuator is actuated in the direction of the pins.

14. The method of winding an armature coil provided with lead loops located on one side of the armature, which armature coil is wound upon an armature having peripheral slots located between teeth, the steps including laying the first turn beginning on the side of the armature opposite the side where the lead loops are to be formed, laying the windings of the first coil in a pair of slots, completing the windings of the coil with the last turn terminating on the side of the armature opposite the side having the lead loops, returning the lead wire in a slot adjacent the slot where the winding terminates, forming a loop in the wire, winding a second coil in a pair of adjacent slots, and repeating the cycles until all of the coils have been wound, terminating the final turn of the final coil on the side of the armature opposite the lead loops, and then returning the initial wire of the first coil and the final wire of the last coil in slots adjacent the first and last coils respectively.

15. The method of winding an armature with windings having lead loops, said armature including a core having an odd number of slots provided with teeth between the slots and requiring an odd number of coils, said method including the steps of initiating the winding of one coil from the side of the armature opposite the side of the armature where the lead loops are formed, indexing the armature with the last turn of the windings of the coil terminating on the side opposite the lead loops, laying the wire in adjacent slots, forming a lead loop, then winding the remaining coils in pairs until all of the coils have been wound, the terminals of the final winding of each coil ending on the side opposite the side of the armature having the lead loops, indexing the armature after completion of the winding of each pair of coils, and repeating the cycles until all of the coils have been wound, the final turn of the final coils terminating on the side of the armature opposite the side having the lead loops, then laying the initial wire of the first coil, the initial wire of one of the second coils, and the wires of the final coils in slots adjacent thereto so as to return the wires to the lead loop side so that a wire at the terminal of each coil is anchored about an adjacent tooth.

16. In a coil winding machine for use in winding an armature having an odd number of slots, the combination including a pair of fliers each adapted to wind a coil in a pair of slots in the armature, and driving mechanism for actuating the fliers, said driving mechanism including a driven shaft, means for drivingly connecting the driven shaft to one of the fliers, and means including an interrupter mechanism for connecting the shaft to the other flier, said means including mechanism for interconnecting the shaft to said other flier in a predetermined angular relationship, said interrupter mechanism including a member connected to the shaft, a second member drivingly connected to said second flier, means for optionally interconnecting the members by a relative movement of the members, a hydraulic piston for disconnecting one member from the other so that when the odd numbered coil is wound the members are disconnected so as to cause the drive shaft to drive one of the fliers without driving the other, and resilient means for actuating the members into engagement with each other.

17. A device according to claim 16, wherein a brake member engages the member attached to the second flier to hold the second flier in arrested position during the winding operation of the odd numbered coil.

18. A device according to claim 16, wherein one of the members is provided with slots and the other member is provided with a plurality of apertures having notched pins mounted therein, the pins being mounted for movement in unison in a direction parallel to the axis of rotation of the shaft.

19. In a coil winding machine wherein the windings are laid in armature slots by means of a pair of fliers driven from a suitable prime mover through a releasable clutch, the combination including means for disengaging the clutch when the last turns of a pair of coils have been wound so as to stop the fliers in a predetermined position, and a flier reversing and re-reversing mechanism, said mechanism including a drive shaft for the fliers, a notched clutch member fixedly attached to the drive shaft, said last mentioned clutch member having a peripherally located notch, a toothed gear rotatably mounted upon the shaft adjacent the notched clutch member, a rack having teeth engaging the teeth of the gear and mounted for reciprocatory movement, said rack normally being positioned in the home and in a stationary position, a bracket mounted for rotation with the gear, a pawl mounted upon the bracket and terminating in a detent adapted to engage the notch, a bracket supported upon the rack, said bracket engaging the pawl to hold it out of engagement with the notch so that the last mentioned clutch member is free to rotate with the shaft, the rack member upon being advanced from its home position releasing the pawl so as to permit it to engage the notch to thereby connect the normally freely rotatable gear to the notched clutch member to reverse the rotation of the fliers when the rack advances in one direction and re-reverse the direction of the fliers when the rack is actuated in the opposite direction.

20. The method of winding an armature with windings having lead loops, said armature being provided with a core having an even number of slots provided with teeth between the slots, said method including the steps of initiating the winding from the side of the armature opposite the side of the armature where the lead loops are formed, winding a pair of coils simultaneously, indexing the armature with the last turn of the windings terminating on the side opposite the lead loops, laying the wires in adjacent slots, forming a pair of lead loops, one for each of the coils, then winding a second pair of coils simultaneously with the terminals of the final winding of each coil ending on the side opposite the side of the armature having the lead loops, indexing the armature, and repeating the cycles until all of the coils have been wound, the final turn of the final pair of coils terminating on the side of the armature opposite the side having the lead loops, then laying the initial wires of the first pair of coils and the wires of the final pair of coils in adjacent slots so as to return the wires to the lead loop side so that a wire at the terminal of each coil is anchored about an adjacent tooth.

JOHN M. BIDDISON.

References Cited in the file of this patent

UNITED STATES PATENTS

| Number | Name | Date |
| --- | --- | --- |
| 1,101,681 | Brimson | June 30, 1914 |
| 1,307,620 | Crane | June 24, 1919 |
| 1,499,659 | Holmes | July 1, 1924 |
| 1,890,111 | Eaton | Dec. 6, 1932 |
| 1,913,046 | Callan | June 6, 1933 |
| 1,987,190 | Holmes | Jan. 8, 1935 |
| 2,348,948 | Allen | May 16, 1944 |

Disclaimer 2,670,145.—*John M. Biddison*, Dayton, Ohio. ARMATURE WINDING MACHINE. Patent dated Feb. 23, 1954. Disclaimer filed June 3, 1966, by the assignee, *Harry W. Moore*.

Hereby enters this disclaimer to claims 1, 2, 3, 4, 14, 19 and 20 of said patent.

[*Official Gazette September 13, 1966.*]